United States Patent [19]
Copeland

[11] Patent Number: 5,668,603
[45] Date of Patent: Sep. 16, 1997

[54] VIDEO FINGER PRINT METHOD AND APPARATUS

[75] Inventor: Gregory C. Copeland, San Jose, Calif.

[73] Assignee: Macrovision Corporation, Sunnyvale, Calif.

[21] Appl. No.: 651,480

[22] Filed: May 22, 1996

Related U.S. Application Data

[62] Division of Ser. No. 294,983, Aug. 24, 1994.

[51] Int. Cl.$^6$ .................................................. H04N 7/08
[52] U.S. Cl. ................................... 348/473; 348/461
[58] Field of Search ............................... 348/461, 465, 348/460, 468, 473, 1, 2, 553, 558, 563

[56] References Cited

U.S. PATENT DOCUMENTS 5,453,794  9/1995  Ezaki ........................... 348/473

*Primary Examiner*—Victor R. Kostak
*Attorney, Agent, or Firm*—Gerow Brill

[57] ABSTRACT

A method and apparatus for inserting source identification data into a video signal prior to its transmission, recording or display. The source identification data (Finger Print) is injected into the active picture area of a video signal without disturbing the viewing of the video signal and the data is retrieved by a data reader, called a Fingerprint Reader. The data injection or "fingerprinting" process consists of dynamically offsetting the video pedestal to carry information which can then be read back from any videotape made from the output of the data-injecting unit. In particular, the fingerprint carries the ID number of the unit used and the current date. The offset lasts for one entire field and has an amplitude of approximately 0.5 IRE—that is, a given field either has the nominal setup or a setup value differing from nominal by 0.5 IRE. The data is repeated every 128 fields in order to provide ample samples for the reader to detect and display the source identification data.

13 Claims, 3 Drawing Sheets

VIDEO FINGER PRINT METHOD AND APPARATUS

This is a divisional application of Ser. No. 08/294,983 filed Aug. 24, 1994.

A portion of the disclosure of this patent document contains material that is subject to copyright protection. The copyright owner has no objection to the facsimile production by any one of the patent disclosure, as it appears in the Patent and Trademark Office files or records, but otherwise reserves all copyright rights whatsoever.

BACKGROUND

With video piracy becoming more rampant by the day, it is becoming more desirable to have a method for identifying whether a video recording or video transmission is originating from an authorized source. Source or tape identification processes using the data transmission capability of the vertical interval have been known to those skilled in the art. However such system suffer from the ease of eliminating the source identification data by blanking and reinsertion techniques. The source identification or "fingerprint" systems known do not transmit the data during the active time of the video signal.

One form of video piracy has been to use a video camera to record the picture and sound off the screen and speakers in a theater displaying a movie. Admittedly this method produces a very inferior copy. However, in certain parts of the world, generally outside of the United States, such a copy is acceptable. The use of video movie projection systems in theaters is becoming more popular. Generally, these systems incorporate a form of video scrambling to protect the electronic video signals prior to projection. However, vertical interval source identification and video scrambling do not protect the projected image once the signal has been descrambled.

A method of source identification of movie and other material is needed to provide a source code to reduce the likelihood of illegal copying and if such copying is done, identify the theater or source of the duplication.

SUMMARY

A method and apparatus injection of data (Finger Print) into the active picture area of a video signal without disturbing the viewing of the video signal and the retrieval of the data by a data reader, a Fingerprint Reader. The data injection or "fingerprinting" process consists of dynamically offsetting the video pedestal to carry information which can then be read back from any videotape made from the output of the data-injecting unit. In particular, the fingerprint carries the ID number of the unit used and the current date. The offset lasts for one entire field and has an amplitude of approximately 0.5 IRE units. A given field either has the nominal setup or a setup value differing from nominal by 0.5 IRE unit.

The reader detects the finger print data from the video signal and process the data for display. From this data a data can determine the source of the video information such as a specific theater and date the video material was played. Another application may be to include such source data at the video is recorded.

DETAILED DESCRIPTION OF THE INVENTION

The data injection or "fingerprinting" process consists of dynamically offsetting the video pedestal to carry information which can then be read back from any videotape made from the output of the data-injecting unit or from a video tape of a screen display of a signal containing the data. In particular, the fingerprint carries the ID number of the unit used and the current date. The offset lasts for at least one entire field and has an amplitude of approximately 0.5 IRE unit. A given field either has the nominal setup or a setup value differing from nominal by 0.5 IRE.

Video Signal 12 to be fingerprinted is inputted to Video Processor 14. Video Processor 14 provides Video Signal 12 to Sync Separator 16 and H & V Blanker 18. Finger Print Data 20 is inputted to Data Modulator 22. Finger Print Data 20 may be in serial or parallel form.

Figure 1:
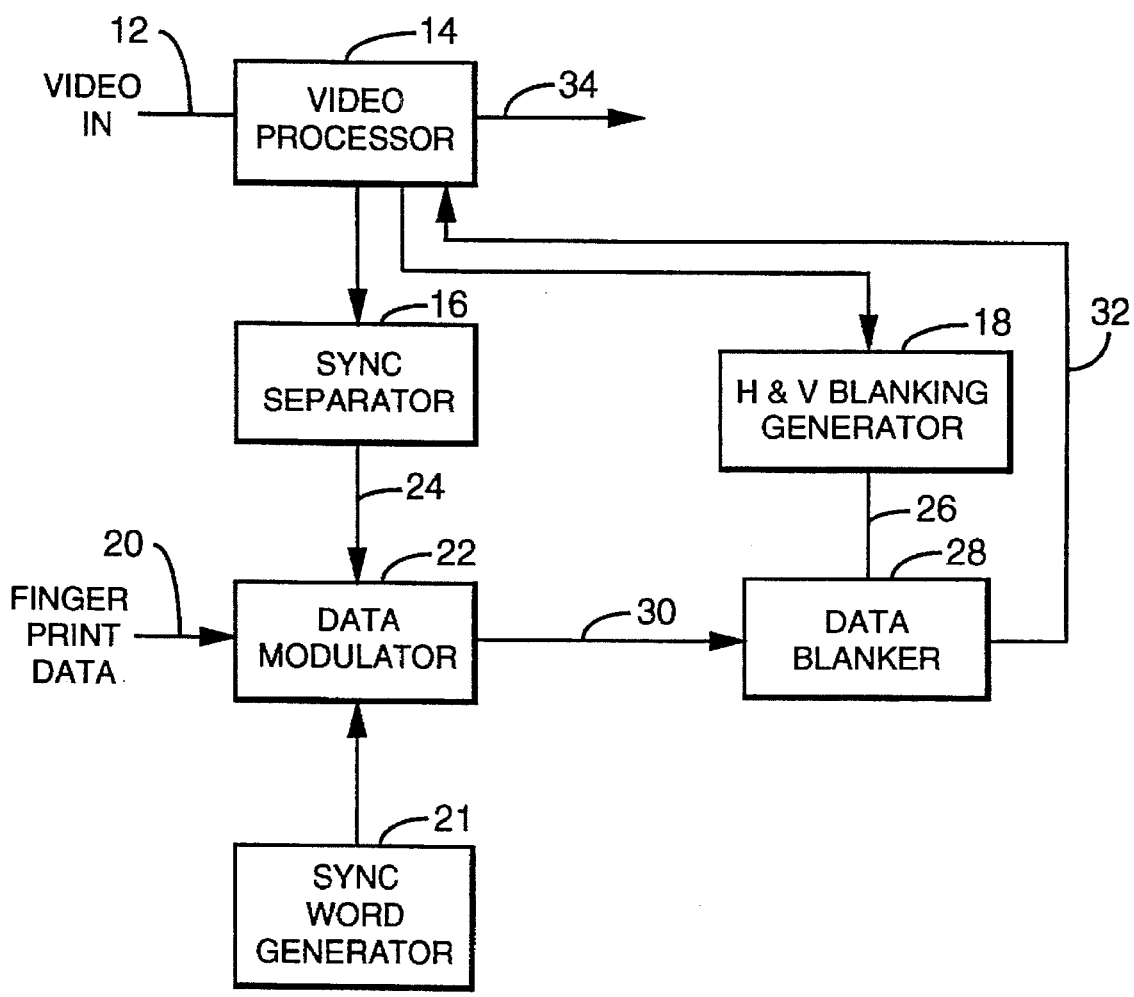
FIG. 1 is a block diagram of the data insertion apparatus.
Figure 2:
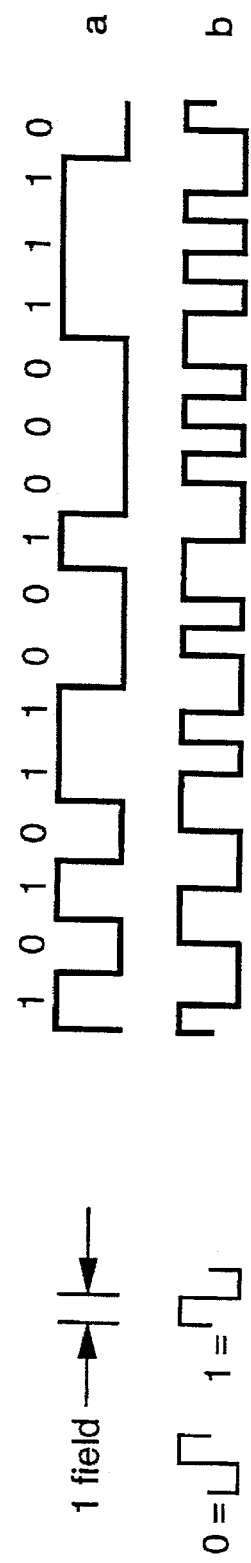
FIG. 2a–f is a series of wave forms representing sync word.
Figure 2:
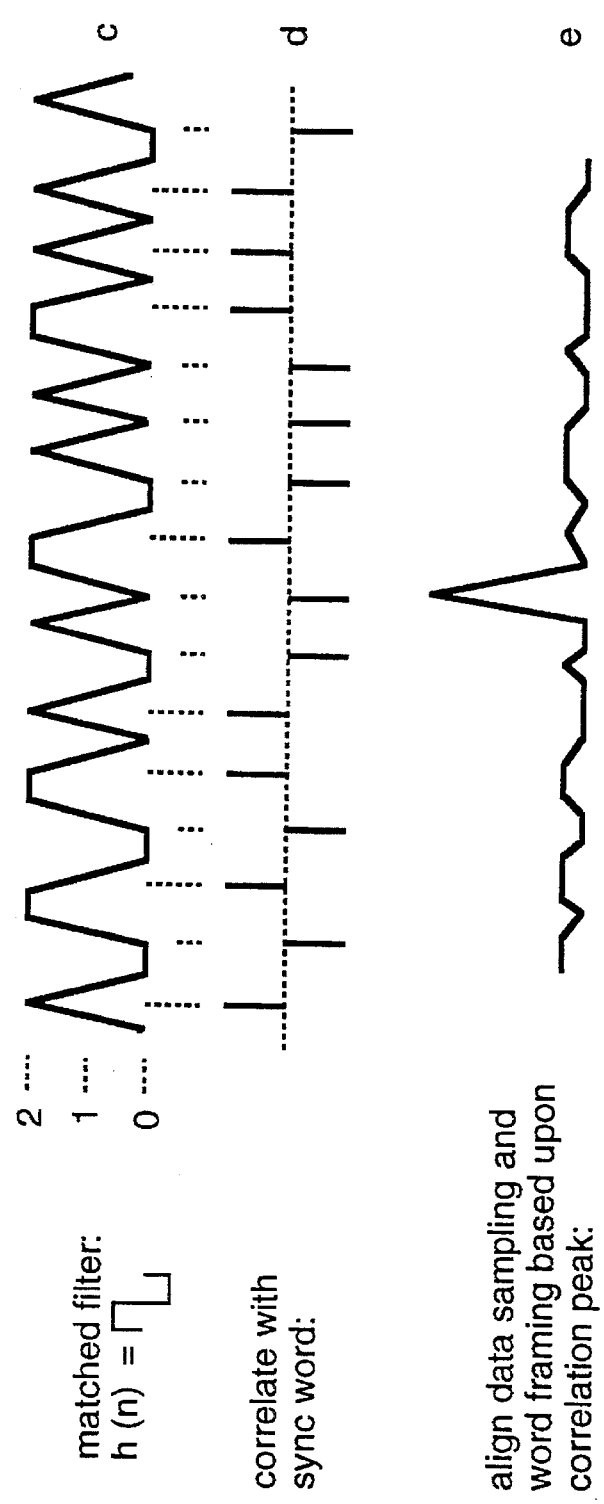

The fingerprint data format is a 64-bit block. The first 16 bits are a (data) frame synchronization word generated by Sync Word Generator 21; the next 16 bits are the source ID number; and the final 32 bits are the date code. A typical sync word is shown in FIG. 2a. The block is repeated indefinitely. The signal format is binary Manchester: a "0" is represented by a 0–1 transition, a "1" by a 1–0 transition, with the phase reference supplied by the sync word as shown in FIG. 2b. Each data bit therefore occupies two fields. It will be apparent to one skilled in the art that other data formats can be used, with the recovery process adjusted accordingly.

Data Modulator 22 receives the Finger Print Data 20 in either serial or parallel form and Sync Word Data 22 and generates Formatted Finger Print Data as described above consisting of 16 bits as synchronization word followed by 16 for a source ID and 32 for a date code. Since the data is to be inputted to a video signal, it is necessary to synchronize the data to the video signal. An output of Sync Separator 16 consists of Vertical (field) Synchronizing Pulse 24. Sync Separator 16 uses techniques known to one skilled in the art of television engineering to separate Vertical Synchronizing Pulse 24 from the video signal. In addition to putting the data in a format usable by the system, Data Modulator 22 synchronizes the beginning of any Formatted Finger Print Data to the field rate using Vertical Synchronizing Pulse 24.

Since the individual bits of this data covers one or more field, it is necessary to blank out the data during the horizontal and vertical blanking periods of the inputted video signal. H & V Blanking Generator 18 receives the video signal from Video Processor 14 and Generates a combined H & V Blanking Signal 26 that is coupled to Data Blanker 28. Formatted Finger Print Data 30 is coupled to a data input of Data Blanker 28. Data Blanker 28 uses H & V Blanking Signal 26 to blank out the data during the horizontal and vertical blanking intervals of the input video signal. The output of Data Blanker 28 is Blanked Formatted Finger Print Data 32 which is coupled back into Video Processor for adding to the video signal thus producing Fingerprinted Video Signal 34.

When Fingerprinted Video Signal 34 is projected on a screen or displayed on a video monitor, the variation in video level due to the insertion is imperceptible to a viewer, but is detected by any video recorder recording the signal directly or via a television camera doing an off-screen recording of the projected image.

Figure 3:
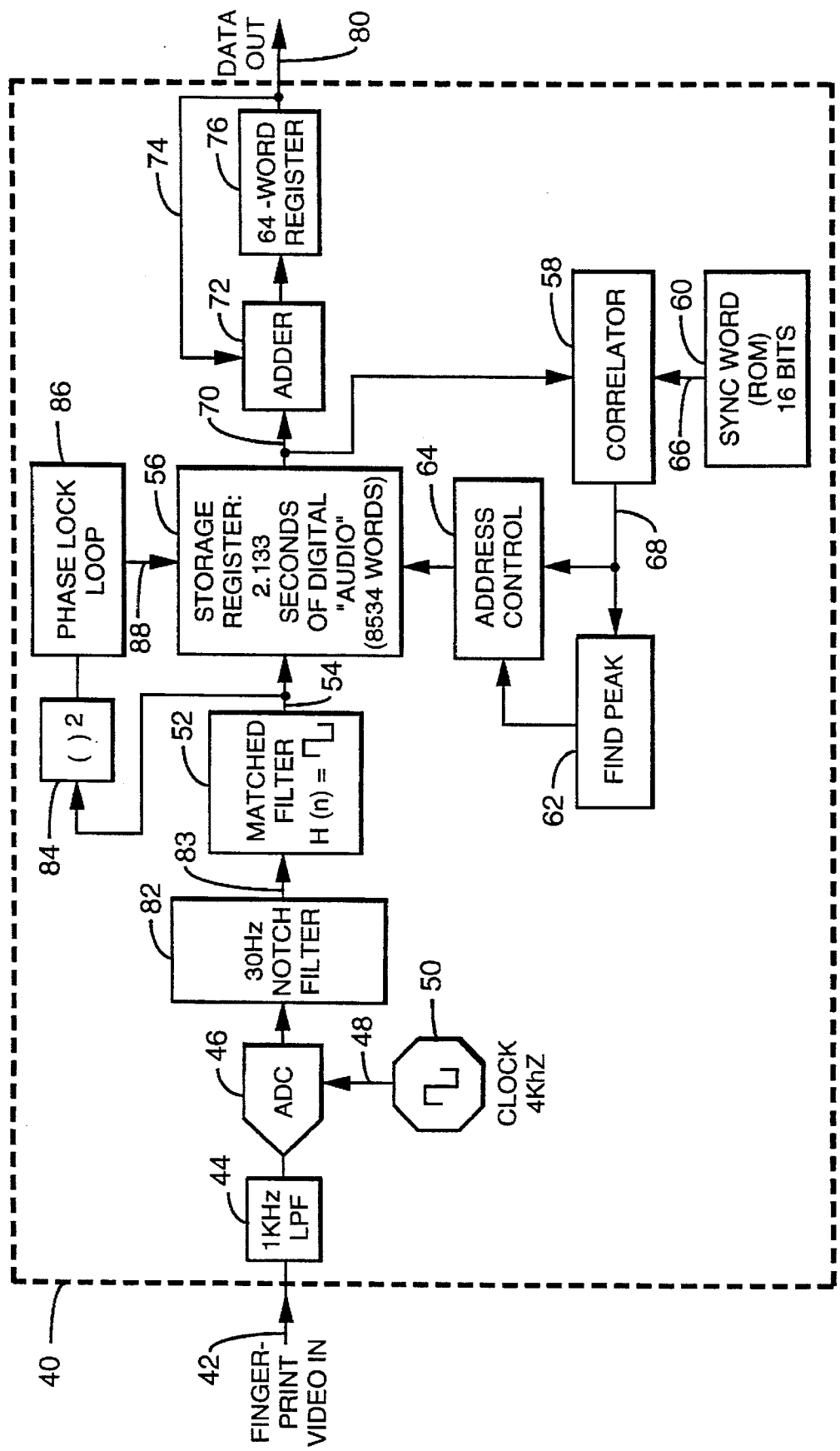
FIG. 3 is a block diagram of the Fingerprint Reader.

The recovery or "reading" process operates is shown in FIG. 3. A Finger Print Reader 40 is used to detect and analyze any Formatted Finger Print Data 30 present in a Fingerprinted Video Signal 42 is coupled to Low Pass Filter 44 with a cut-off frequency of about 1 Khz. The output of Low Pass Filter 44 is coupled to 30 Hz Notch Filter 82. 30 Hz Notch Filter 82 is used to remove a 30 Hz component that can be observed in the data as a frame to frame variation in tape output level due to differences in playback video heads. The 30 Hz Notch Filter can be places either before or after Matched Filter 52.

The output of 30 HZ Notch Filter 82 is coupled to Analog to Digital Converter 46. Analog to Digital Converter 46 also receives Clock Signal 48 from Clock Generator 50. The clock frequency is approximately 4 Khz. However clock frequencies from 1 Khz. to 15 Khz. are equally usable. The clock frequency also may be locked to the imcoming video. The output of Analog to Digital Converter 46 that is shown in FIG. 2b is coupled to Matched Filter 52. Matched Filter 52, to a first approximation, doubles the data amplitude and largely cancels the video content. The output of Matched 52 is represented by FIG. 2c.

The output of Matched Filter 52 may not always provide a sufficiently clean signal for further processing due to time base errors in the playback signal. To improve the usability of the output signal of Matched Filter 52 is coupled to Squarer 53 to Phase Lock Loop 55 to generate a clock signal at the bit of the data. This clock signal is coupled to Storage Register 56 to eliminate variations in the data due to time base errors.

The output of Matched Filter 52 that contains data with canceled video is then correlated to the sync word to establish the data framing. Once the data is properly framed, it is digitally integrated to further improve the Signal to Noise Ratio (SNR). This process consists of writing the digitized values of 128 consecutive fields into Storage Register 56 that contains 128 individual registers that have been clocked by Clock Signal 57. Shift Register 56, Correlator 58, Sync Word Generator 60, Peak Detector 62 and Address Control 64 are in a loop that is used to synchronize the data to make it readable by the User. The output of Storage Register 56 is coupled to Correlator 58. In addition a preprogrammed Sync Word Generator 60 couples a unique Sync Word 66, as shown in FIG. 2d, to Correlator 58 to correlate the sync word information in the Fingerprint Data 32 with Sync Word 66. Correlation Data 68, as shown in FIG. 2e is coupled to Peak Detector 62. If there is a match, adding the digitized values of the next 128 fields to those of the first, and continuing the process as required. As the accumulation proceeds, the data value in each register will be directly multiplied by the number of passes while the video and noise will tend to average out. After a suitable number of passes, generally in excess of twenty, the recovered sequence of 128 high or low offset fields is coupled to Adder 72 and 64 Word register 76 where the data is decoded to the original 64 bits, and the pertinent data is read out to output terminal 80.

The apparatus described above may use a hardware implementation or a combination of hardware and software. Attached is the source code information using the Matlab language for a software implementation of part of the fingerprint reader.

The data that is read out can be connected to any display device capable of reading a 64 bit data stream. Such a device could be an alphanumeric display, a computer screen or incorporated back into the video signal for an on screen display. The display device displays the ID number and date code.

During an experiment using the elements described above, data has been found to be recoverable down to the vicinity of ½ millivolt on a 1 volt video signal, less than 0.1 IRE.

It is important to note, that unless the sync word in the insertion device and the reader are identical, no output will result or misleading results will be obtained. In order to make the reading device have a more universal use, the sync word Generator in the reader has an ability to be preprogrammed either by the manufacturer for the user or by the user.

In principle, while using the system described above, a person attempting to defeat the system could simply blank or otherwise distort one or two fields out of every 128 fields, a distortion which might be brief enough not to significantly affect the utility of the pirated signal. Since the data is periodic, this would distort one of the characters. Which character in particular would not be known, but with the present data format, there is be a 25% probability of hitting one of the ID number characters, thereby disguising the identity of the pirated unit. Alternatively a pirate may add a signal that will swamp or override the original fingerprint so that the fingerprint reader produces inconsistent or incorrect results.

An alternative implementation has some advantages. In a technique similar to that used for spread-spectrum transmission, the basic data rate may be slowed, and Exclusive-Ors with a knownpseudo-random sequence at the original frame rate. Normally the pseudo random sequence will be much longer than the data sequence. This has the advantage of keeping the setup variation rate high, to minimize visibility of the data, while insuring that any attempt to mask a data character would blank an unacceptably long portion of the signal. A second alternative would simply randomly interchange the position of data bits within the block in a time-variant manner, such that no periodic distortion would suffice to distort any particular data character. Data recovery for this second method is clearly more complex, but well within the state of the art. A third alternative may be to encrypt the data prior to it being added to the signal and using complementary decryption techniques for detection.

The apparatus and method described above describes a system and method of adding a finger print signal to a video signal. One of the principle uses of this method and apparatus is to prevent piracy or identify the source of the pirated video material. Another embodiment of the concept is to fingerprint an original film that is ultimately recorded into a video format. This can be accomplished by one of two methods. The film as it is being duplicated in film has a bias light source with a short turn on/off time to provide a small increase of illumination in the film printer. This bias would sufficiently low to create a very small shift in the brightness, but not be visible to a viewer of the film. A second method is to provide such a bias during the projection of the film. The rate of the bias light takes into account the various projection media, direct film projection at 24 frames per second, 25 frames per second when used in a 50 Hz television system or the 3/2 mechanism when used in a 60 Hz television system.

The above description is illustrative and not limiting. Further modifications will be apparent to one of ordinary skill in the art in light of this disclosure.

```
function [zc,y,loc] = finger2(file_name,sim)
% This function computes the fingerprint values given the input
% filename. It also plots intermediate results for debugging and
% visualation. This function assumes that the input is in voc
% type 1 format digitized at 4 KHz. The data is assumed to be
% frame of 64 bits manchester encoded with a sync word of 16 bits
% followed by 16 bits of decoder id, 3 bytes of date data (in bcd)
% and finally 1 byte of spare presently set to 0's. Data is
% assumed to non-inverted, although it is believed that the decoder
% now ouputs inverted fingerprint. The sound blaster used did not
% invert the data on input, but the sound blaster inverted the data
% on output. The data was collected using the program named
% fingrprt.exe and executed from the DOS prompt.
%       Greg Copeland 8/16/94
%
% Get the data and decimate by 8 using a 256 tap
% low pass filter. Each bit before decimation is approximately
% 133 samples long (4000 Hz sample rate/30 Hz bit rate). After
% decimation each symbol period then becomes
% approximately 16.7 (4000 Hz/30 Hz/8) samples long.
%
if sim==1                               % 1 for data, 0 simulation
    fid = fopen(file_name);% open the input file
    x = fread(fid,100,'uint8');         % eliminate the header info
    i=0; x0 = zeros(8,1);               % clear filter state
    x1 = x0; x2 = x0; x3 = x0;          % create lpf for decimation
    lpf = firls(123,[0 .08 .125 1],[1.0 1.0 0.0 0.0]);
    m = [-ones(1,66) 0 ones(1,66)];% and conv with matched filt
    lpf = conv(lpf,m);                  % for combined filtering
    plot(20*log10(abs(fft([lpf zeros(1,8*size(lpf))])+.00001)));
    pause(1);
    dec = 8;
    flag = 1;
    x0 = zeros(256,1);
    x = zeros(dec,1);
    while flag                          % loop for each 8 sample blk
        x0(1:256-dec)=x0(dec+1:256);% until no more data avail
        [x,count] = fread(fid,dec,'uint8');    % read input file
        flag = count == dec;            % full block to use ?
        if(flag)
            x0(256-dec+1:256)=x(1:dec);% shift state info
            i = i+1;
            z(i) = x0' * lpf;           % find decimation sample
        end
    end
    y = z;
    clear lpf                           % free memory for later use
    clear x0                            % these vars are no longer
    clear x                             % needed
    clear z
else                                    % if here generate test data
    pad = rand(1,48) > .5;              % generate some random data
%
%       find the sync word, using correlation and display results
%
    m=[1 0];% A     C     8                E
    sync= [m -m m -m m m -m -m m -m -m     m m m -m zeros(1,96)];
    zc = real(iffit(fft(z).*conj(fft(sync))));
    zc = zc/max(abs(zc));               % normalize cross correlation data
    plot(zc);                           % plot corr for debug
    pause(1);                           % Oh, you want to see the results?
    index = find(zc==max(zc))           % find the location of the corr peak
    zs = zeros(1,128);                  % and rotate the data to the normal
    zs(index) = 1;                      % orientation
    zc = real(iffit(fft(z).*conj(fft(zs))));
    zc = zc(std(abs(zc));
    zc = zc-mean(zc(1:2:32));           % offset compensation
    plot(zc(1:2:128))                   % due to flutter @ 30 Hz
    dataout = zc(1:2:128)>0;            % decode bits
    if sim == 0                         % test for errors
        'bit errors = ',sum(xor(datain,dataout))
    else
        'bit errors = ',sum(xor([1 0 1 0 1 1 0 0 1 0 0 0 1 1 1 0],dataout(1:16)))
    end
    byte_w = [8 4 2 1];                 % convert bits to hex out
    bytes = zeros(1,16);
    hexstr=['1' '2' '3' '4' '5' '6' '7' '8' '9' 'A' 'B' 'C' 'D' 'E' 'F'];
    for i=0:15                          % loop for each hex digit
        t = byte_w*dataout(1+4*i:4+4*i)' + 1;
        bytes(i+1) = hexstr(t);
```

```
end
'sync dec id date spare'        % display decoded data
bytes                           % here
A = [1 1 0                      % state transition matrix
     0 1 0                      % phase,period,aux1,aux2
     0 0 .8];                   % aux to decorrelate err measurements
C = [1 0 1];                    % observation matrix
Rw = 1;                         % observation noise covariance
Rx = 20*eye(3);                 % initial state covariance
Ru = [0 0 0                     % model driving covariance
      0 .00001 0
      0 0 .00001];
%
%       This is an interpolation filter for finding the
%       interpolated matched filter output. This is required
%       becuase the symbol clock may not land exactly on a
%       sample.
interp = firls(64,[0 .12 .13 1],[1 1 0 0]); % simple ls fir
interp(65) = 0;
interp = interp/sum(interp(33));% normalize interp filter
j=1; k = 1;                     % init some loop vars
z = zeros(1,128);
[n,m] = size(y);
pass = 1;
while x(1) < m-10               % x(1) is the sample #
    i = floor(x(1)); frac = x(1) - i; % i is the integer sample #
    e = -(phase(1) + 0.255*frac);% find the phase err
    Rv = C*Rx*C' + Rw;          % update the error variance
    Rvi = inv(Rv);              % and its inverse
    G = A*Rx*C'*Rvi;            % calculate Kalman gain
    x = A*x + 2*G*e;            % compute prediction state
    Rx = Rx - Rx*C'*Rvi*C*Rx;   % find prediction covariance
    Rx = A*Rx*A' + Ru;          % find state est covariance
    iindex = 9-floor(8*frac);   % interpolate sample
    yt = y(i-3:1:i+4); it = interp(iindex:8:56+iindex);
    yi = yt * it';              % this is the interp result
    if(pass > 1)                % allow 1 frame pass to
        ze = yi - z(j);         % establish good clock
        if(ze > 1) ze = .5; end% hard limit for noise
        if(ze < -1) ze = -.5; end  % spikes
        z(j) = z(j) + ze/pass-1);% accumulate data each pass
    end
    loc(k,:) = [x(2)-8 x(3) e yi];% diagnostic vector
    k=k+1; j=j+1;               % update loop counters
    if(j > 128)                 % mod 128 for accumulation
        j = 1; pass = pass+1;%  (128 1/2 symbols/frame)
    end
end
plot(z);                        % data accumulated at symbol
pause(1);                       % intervals
plot(loc);                      % plot vco freq,aux var,
pause(1);                       % phase error, and sample value
datain = [1 0 1 0 1 1 0 0 1 0 0 0 1 1 1 0 pad]; % with sync
y = 2*datain - ones(1,64);
y = kron(y,[ones(1,8) 0 -ones(1,8)]);  % symbol waveform
y = kron(ones(1,3),y); % gen 3 frames
y = 0.0625*conv(y,[-ones(1,8) ones(1,8)]); % matched filtering
y = y + 0.25*randn(y); % additive noise
end
z = y;                          % this is a simple agc
[m,n]=size(z);
y(1:16) = y(1:16)/std(z(1.31)); % normalize data by the
for i=17:16:n-32                % max in the block and
    s = 1.0/std(z(i-16:i+31));  % adjacent blocks
    y(i:i+15) = s*z(i:i+15);
end
i=i+15;
y(i:n)=zeros(i,n-i+1);          % clear tail
clear z;                        % free some more memory
plot(y);                        % plot. agc'ed data
pause(1);
%       next we aquire symbol clock and decimate again by this clock
%       This phase consists of taking the matched filter output,
%       differentiating, multiplying by the matched filter output and
%       filtering around twice the symbol clock frequency. The fiter
%       is complex, so that the phase of the filtered data may be found
%       for later use in the Kalman filter symbol synchronizer
%
dif=0.5*conv([1 0 -1],y); % differentate data
y = [0 y 0];                    % pad input to same length
```

```
-continued
err = dif .* y;                        % product of each
[a,b]=size(err);                       % build bpf around clock
bitfilt = [sin((-63:63)*(pi/4.15))-j*cos((-63:63)*(pi/4.15))];
bitfilt = bitfilt' .* hanning(127);% freqency
err = conv(err,bitfilt);               % band pass the data
[c,d]=size(err);
err(1:63)=[]; err(b+1:d)=[];
phase = -atan2(imag(err),real(err))/pi; % find the phase of bpf out
err = real(err)/max(real(err));
m= 400; n=450; t=m:n;                  % plot some debug stuff
plot(t,y(m:n),'w',t,err(m:n),'b',t,dif(m:n),'r',t,phase(m:n),'g');
pause(1);
clear dif                              % free memory
%
%       This is the Kalman filter for tracking the symbol clock
%
%       Kalman filter parameters
%
%       X(k+1) = A * X(k) + U(k)  model
%       Z(k) = C * X(k) + W(k)    observation
%
x=[10 8.35 0]'; % initial state var(phase,period,aux1,aux2)
```

I claim:

1. An apparatus for detecting a source identification signal within an active picture area of a video signal comprising:

a low pass filter that receives said video input signal containing said source identification data signal within said active picture area;

a clock signal generator;

an analog to digital converter wherein said analog to digital converter receives said low passed video signal and said clock signal;

a matched filter wherein said matched filter detects said source identification data signal;

a sync word generator to generate a first sync word;

a storage and synchronization system to store said data and synchronize a second sync word contained within said source identification signal so as to produce a readable source identification signal;

a register to store said readable source identification signal; and a display device to display information within said readable source identification signal.

2. An apparatus as in claim 1, wherein said low pass filter has a cutoff frequency between 200 Hz and 1 Khz.

3. An apparatus as in claim 1, wherein said clock signal has a clock frequency about four times a low pass cutoff frequency of said low pass filter.

4. An apparatus as in claim 1, wherein said sync word generator comprises a preprogrammed read only memory.

5. An apparatus as in claim 1, wherein said sync word generator comprises a user controlled keyboard or key pad.

6. An apparatus as in claim 1, wherein said display is selected from the group consisting of an LED, LCD, a cathode ray display and an on screen insert to a video display device displaying said video signal, wherein said information is displayed within said within screen insert.

7. An apparatus for detecting a source identification signal within an active picture area of a video signal comprising:

means for low pass filtering said video signal;

means for converting said low passed video signal to a digital signal;

means for generating a first sync word;

means for synchronizing said source identification signal containing a second sync so as to provide readable source identification information;

means for displaying said source identification information.

8. A method for detecting a source identification signal within an active picture area of a video signal comprising:

low pass filtering said video input signal containing said source identification data signal within said active picture area;

generating a clock signal;

converting said data signal from an analog signal to a digital signal wherein said analog to digital conversion receives said low passed video signal and said clock signal;

match filtering said digital signal wherein said matched filter detects said source identification data signal;

generating a first sync word;

storing said data and synchronizing a second sync word contained within said source identification signal so as to produce a readable source identification signal;

storing with a register said readable source identification signal; and displaying information within said readable source identification signal.

9. A method as in claim 8 wherein said low pass filtering has cutoff frequency between 200 Hz. and 1 Khz.

10. A method as in claim 8, wherein said clock signal has a clock frequency about four a low pass cutoff frequency of said low pass filter.

11. A method as in claim 8, wherein the step of generating a first sync word comprises reading from a preprogrammed read only memory.

12. A method as in claim 8, wherein the step of generating a first sync word comprises entering said sync word from a user controlled keyboard or key pad.

13. A method as in claim 8, wherein the step of displaying is performed on a display device selected from the group consisting of in LED, LCD, a cathode ray display and an on screen insert to a video display device displaying said video signal, wherein said information is displayed within said within screen insert.

* * * * *